United States Patent [19]

Dodge

[11] 4,023,436

[45] May 17, 1977

[54] ARTICULATED HANDLEBARS FOR BICYCLES AND THE LIKE

[76] Inventor: Peter W. Dodge, 334 E. Ninth St., No. 11, New York, N.Y. 10003

[22] Filed: Dec. 29, 1975

[21] Appl. No.: 644,716

[52] U.S. Cl. .............................. 74/551.3; 74/551.4; 74/551.5

[51] Int. Cl.² ................... B62K 21/16; B62K 21/12

[58] Field of Search ........... 74/551.3, 551.4, 551.5, 74/551.6, 551.7, 551.9, 551.1

[56] References Cited

UNITED STATES PATENTS

| 637,400 | 11/1899 | Miller | 74/551.3 |
| 3,481,218 | 12/1969 | Yoshikawa | 74/551.3 |

FOREIGN PATENTS OR APPLICATIONS

| 590,399 | 4/1945 | France | 74/551.3 |
| 14,768 | 6/1896 | United Kingdom | 74/551.3 |

Primary Examiner—Leonard H. Gerin

Attorney, Agent, or Firm—Tab T. Thein

[57] ABSTRACT

Articulated handlebars for bicycles, motorcycles and the like, which have conventional support means thereon for handlebars, comprising elongated, substantially horizontal attaching means with a clamp or a pair thereof for removably fixing the attaching means to the support means; at least one supporting means, mostly vertical, at an angle to the attaching means; one or a pair of handle shaft means associated with the supporting means, for carrying at its or their outer end(s) one or a pair of handles; and respective securing means for attaching the supporting means to selected portions of the attaching means, and the handle shaft means to selected portions of the supporting means, respectively; whereby any spatial, height, length and angular attitude can be set for the handle(s), as required by the operator of the bicycle, motorcycle and the like. Various exemplary embodiments and structural solutions are disclosed.

25 Claims, 35 Drawing Figures

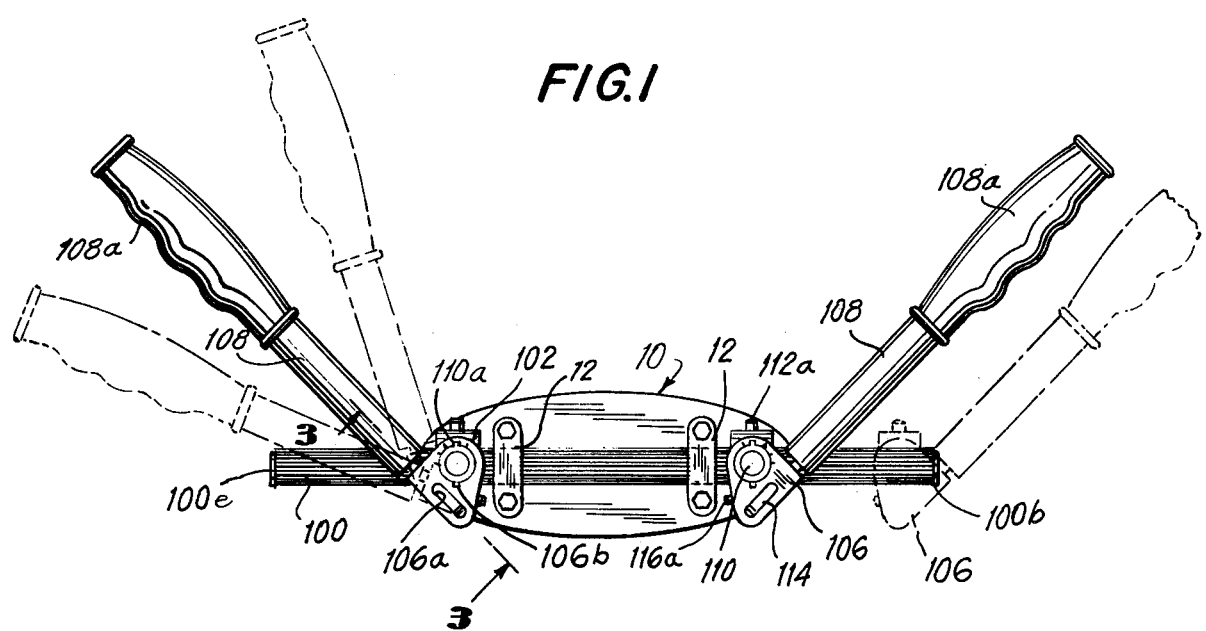
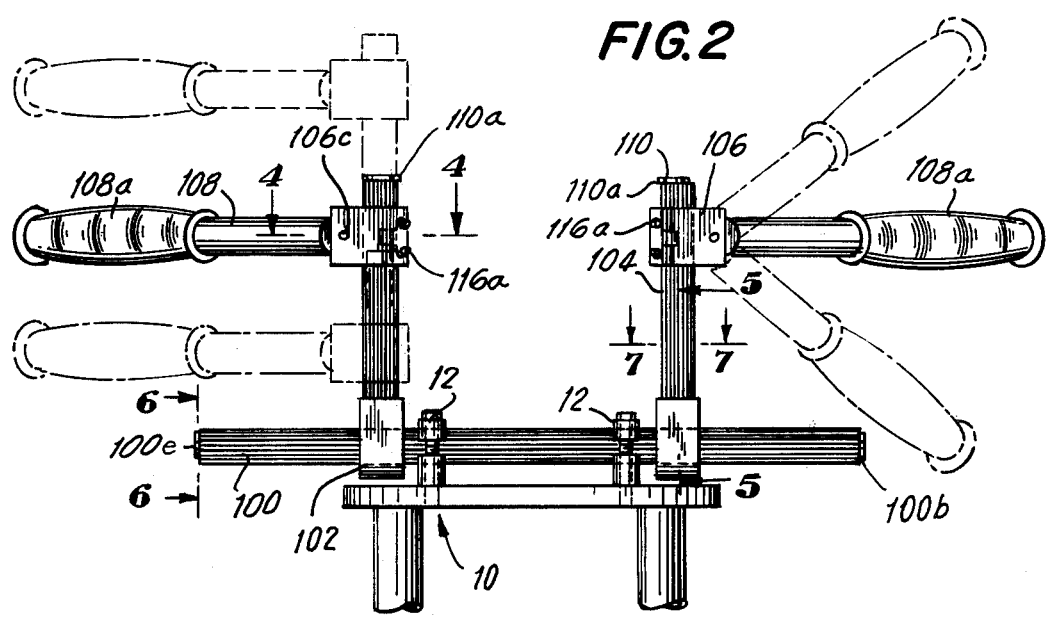
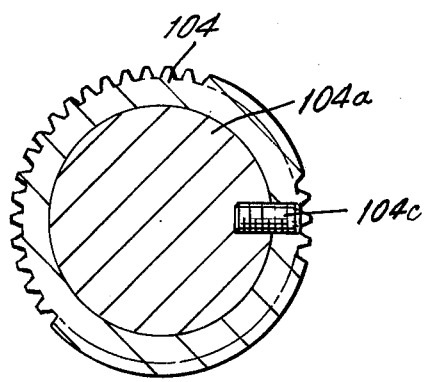

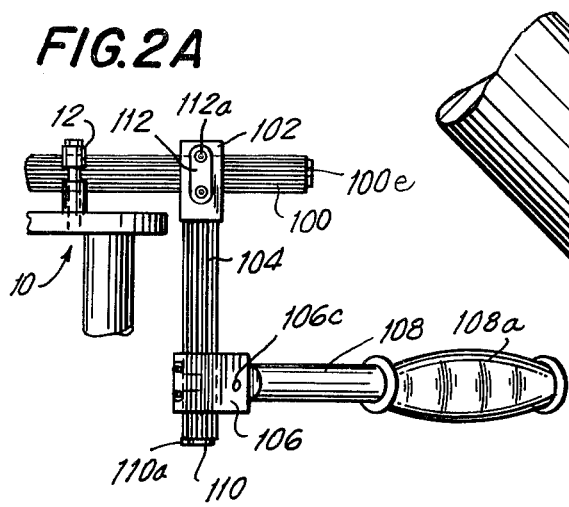
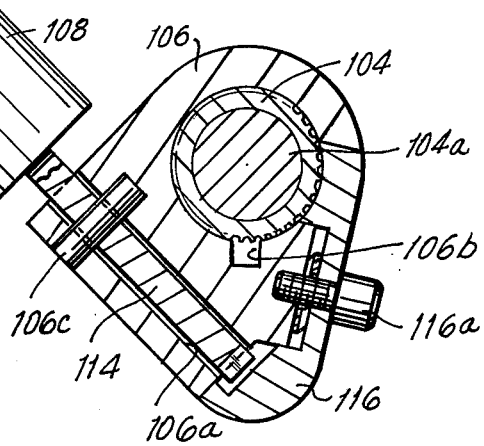
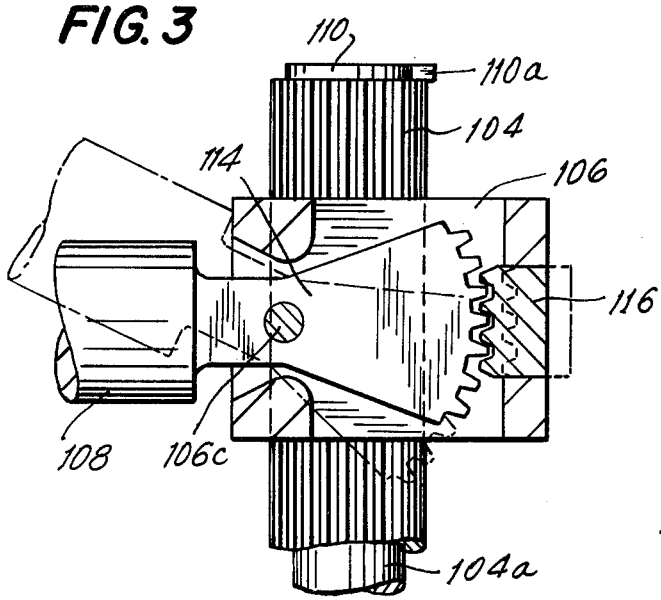
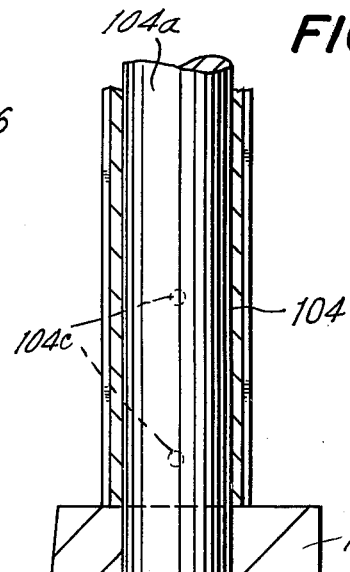
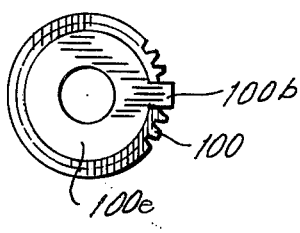
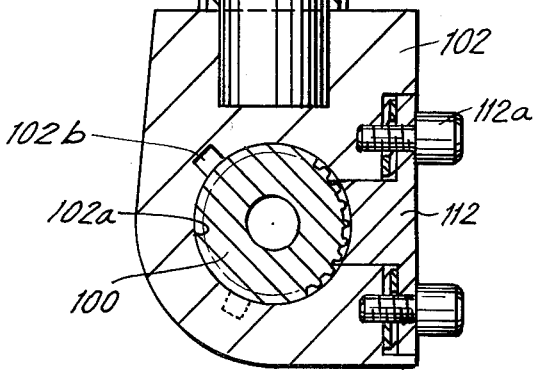

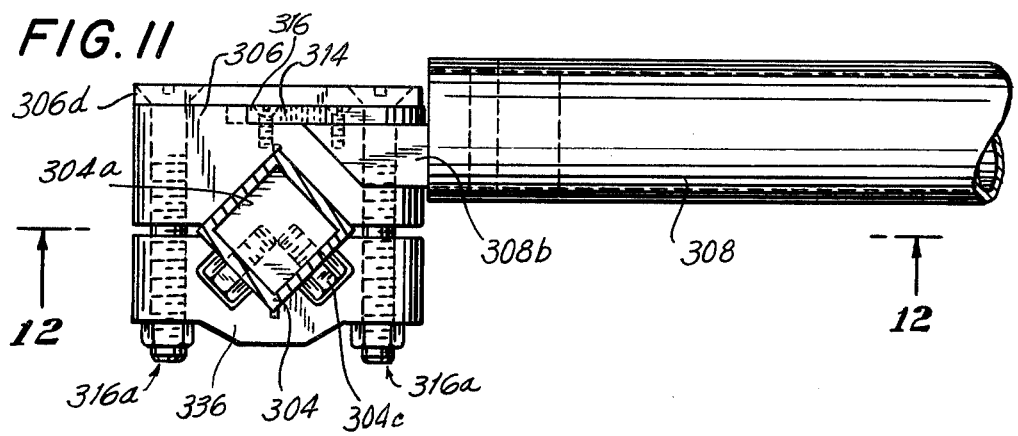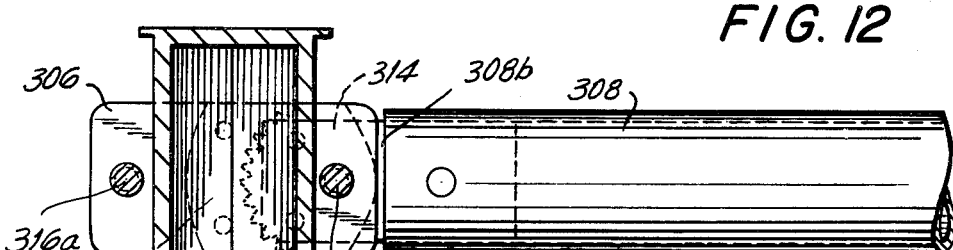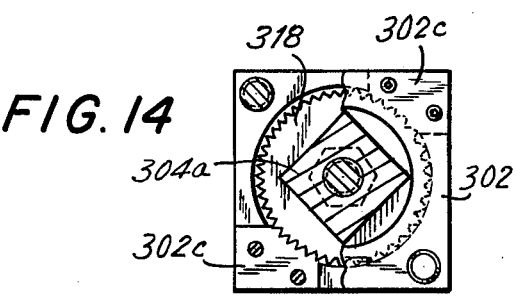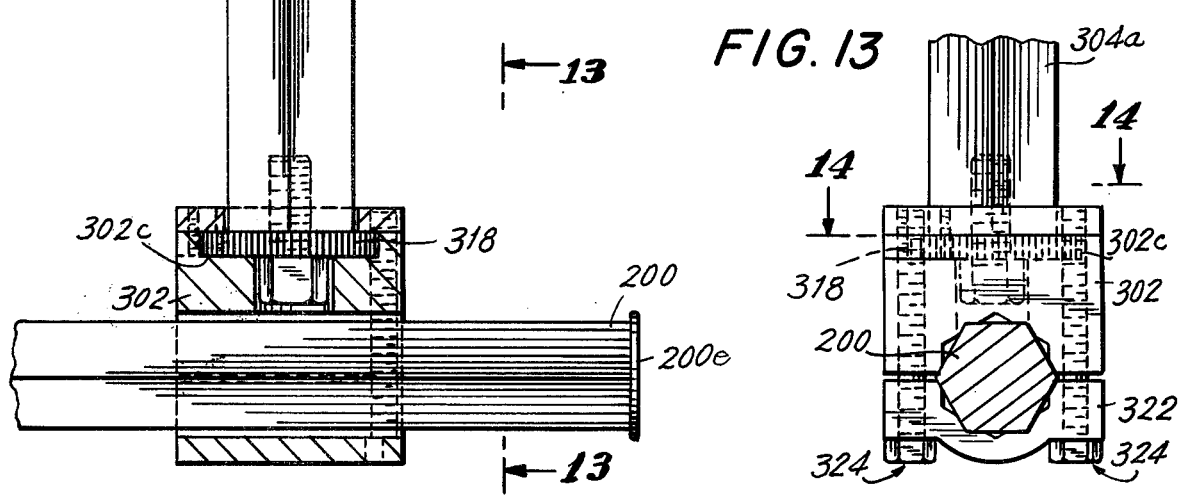

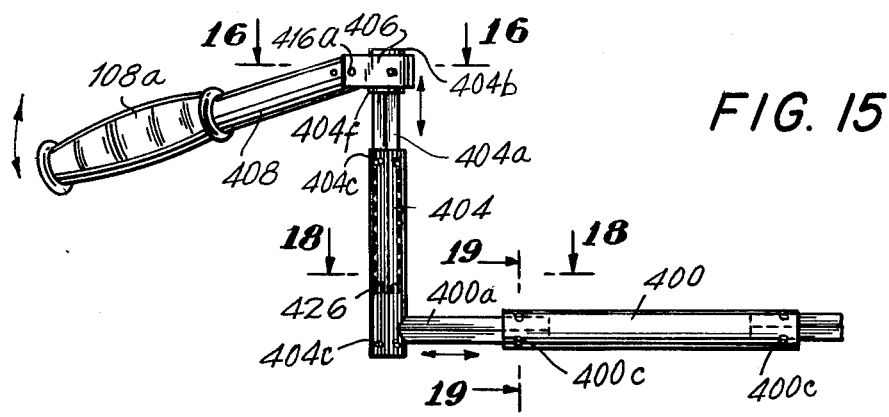
FIG. 15
FIG. 16
FIG. 17
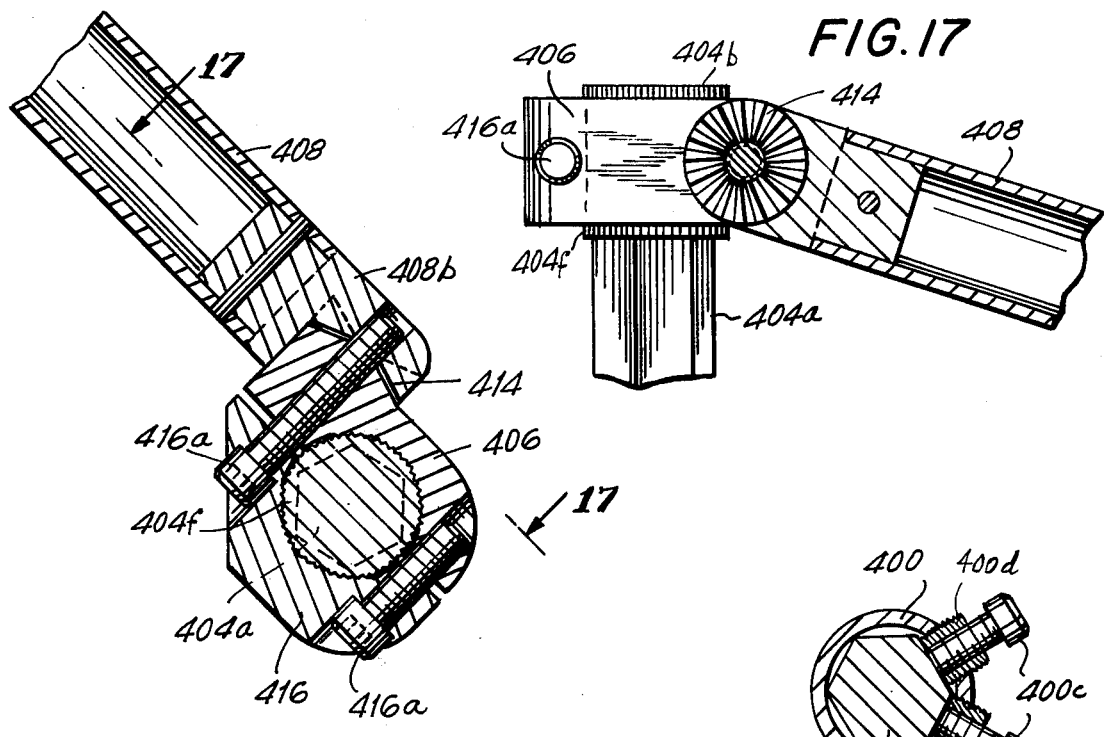
FIG. 19
FIG. 18
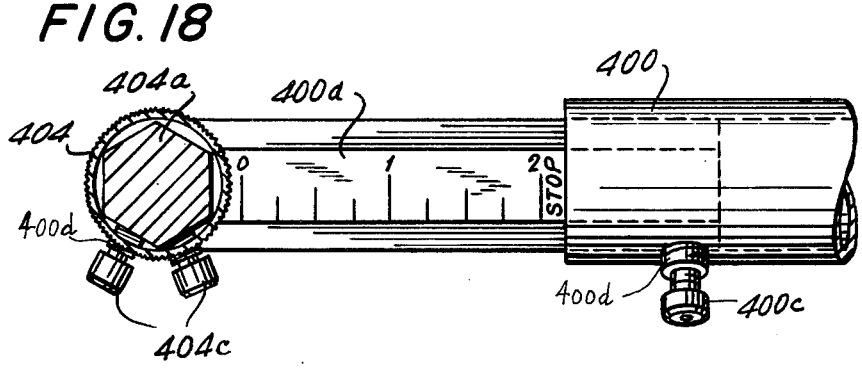

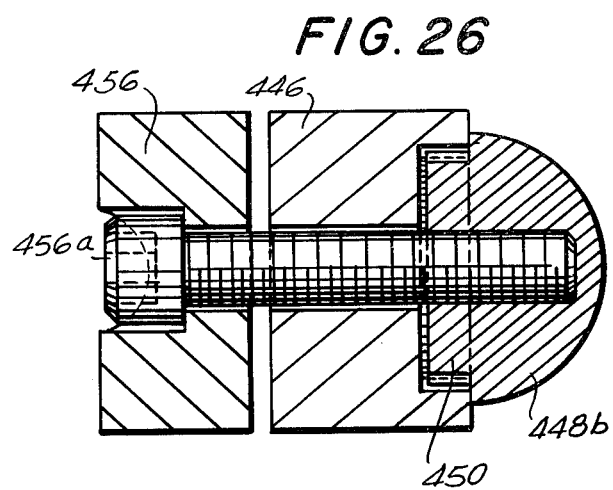
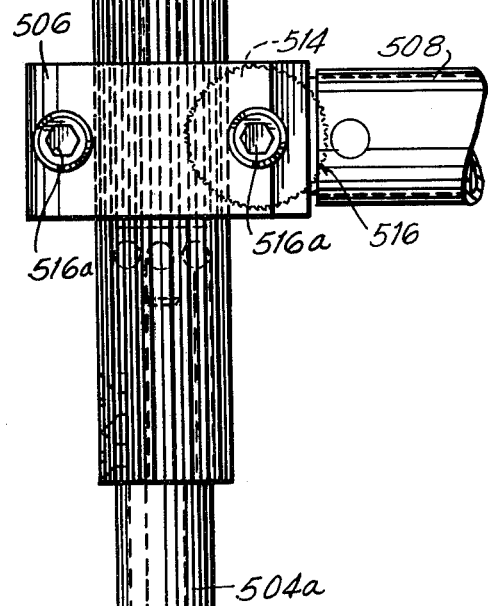
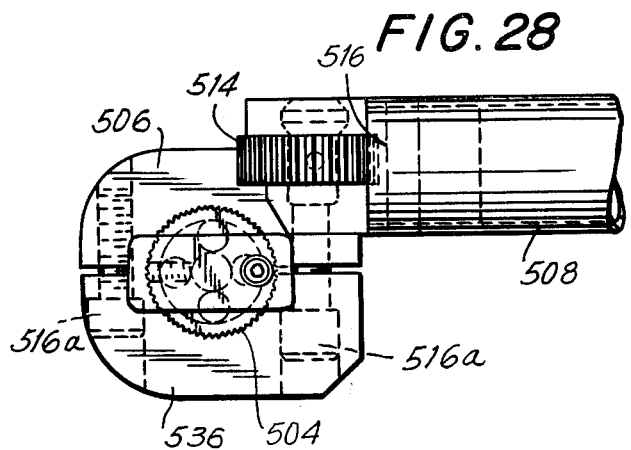
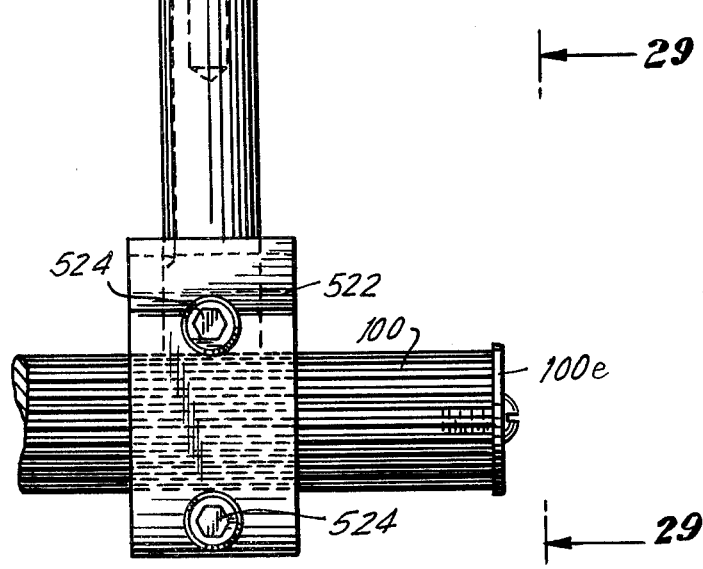
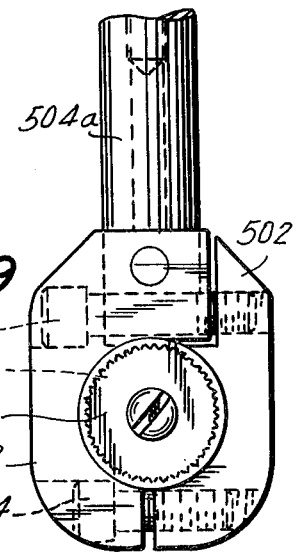

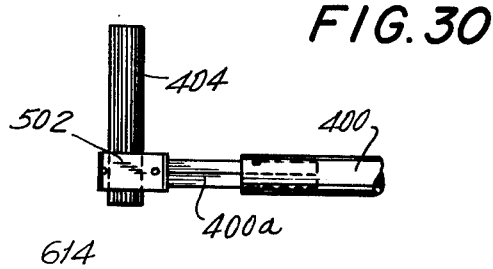
FIG. 30
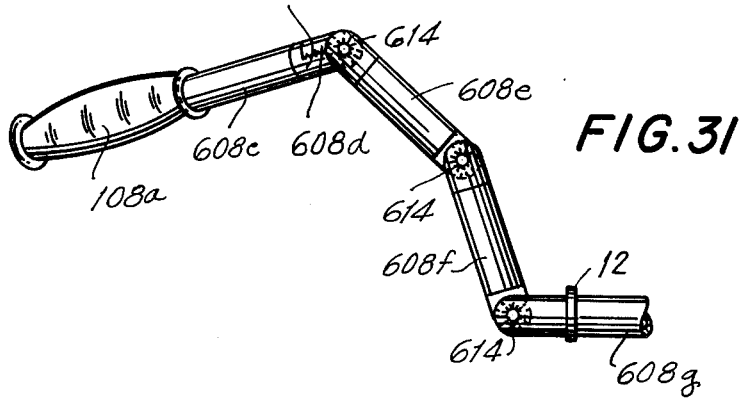
FIG. 31
FIG. 32
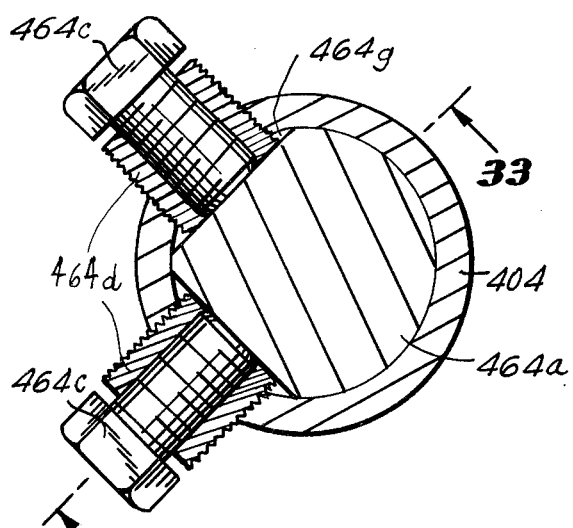
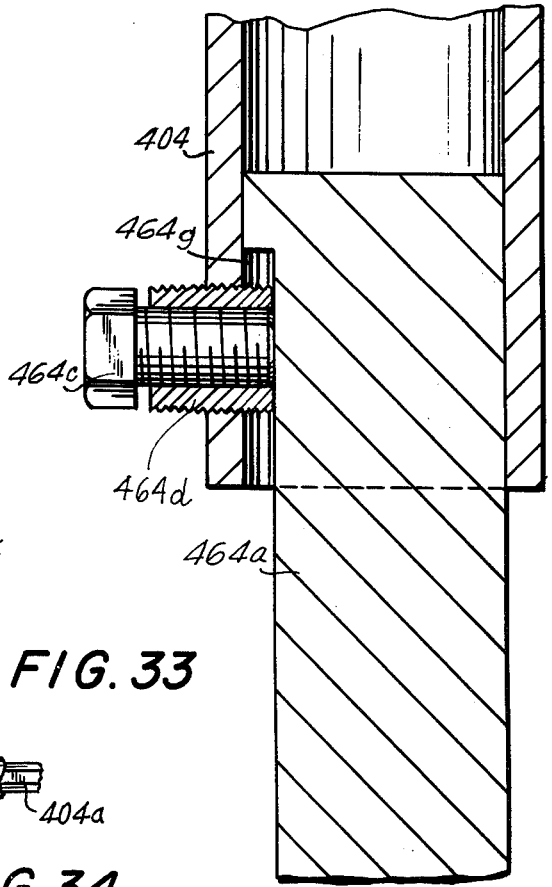
FIG. 33
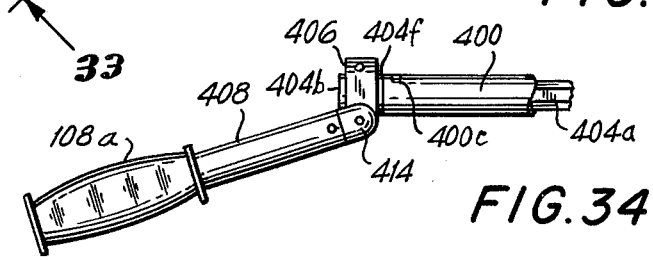
FIG. 34

ARTICULATED HANDLEBARS FOR BICYCLES AND THE LIKE

The present invention relates to bicycles and motorcycles, and particularly to articulated handlebar structure thereof. In lieu of the hitherto used relatively simple arrangement, the invention proposes articulated, variably adjustable and fixable elements that can be varied, moved, combined in numerous ways, thereby allowing any spatial, height, length and angular attitude of the handles to be set, as required by the operator, namely for various uses of the bicycle or motorcycle.

Touring, racing, and other uses are well known examples where the operators or riders may prefer one height, extension, or angular attitude over the other, which would ordinarily require an entirely new handlebar structure to be attached in lieu of the one originally supplied with the bicycle or motorcycle. The invention does not require such installation work, yet allows numerous attitudes to be set up, even during use, e.g. while on a touring trip, if the vehicle is already fitted with the novel articulated handlebars, as will be understood from the following description.

The invention also provides handlebars that can easily be adapted to operators or riders of various heights, e.g. persons with a tall, medium or a small build; persons with short or long arms; not to mention personal preferences in riding such vehicles.

It is well known that touring riding requires a high handlebar setting whereas twisty, winding roads and "sport" riding require so-called "clip-on" or racing bars.

The inventive articulated handlebars have other, ancillary advantages, such as the possible damage occurring during an accident, which can be greatly reduce because it will require only one (or possibly a pair of) portions or parts to be replaced, instead of replacing an entire set of handlebars of the conventional construction. Also, because a section of the handlebars can be quickly removed, this facility makes the handlebars inoperable and thus acts as a theft deterrent.

In manufacturing and sales, the new handlebars present the added advantage of requiring only a few universally adaptable parts to be stocked, instead of "small", "medium" and "large" sizes, with varying configurations, and so on. Fitting of new motorcycles, replacements, repairs are all made much simpler and faster.

According to major features of the invention, the articulated handlebars comprise elongated base bars, constituting attaching means with means for fixing the structure to conventional parts of the bicycle or motorcycle; one or a pair of (usually vertical) supporting members at an angle with respect to the attaching means; one or a pair of handle shafts for carrying at the outer end(s) conventional handles; as well as base and top clamps, called securing means, for respectively attaching the supporting means to certain portions of the attaching means, and the handle shafts to portions of the supporting means, respectively, all this in an adjustable and fixable manner, so that any spatial, height, length and angular attitude can be set for the handles, as required by the operator or rider of the bicycle and the like.

The invention embodies various optional features that can be used individually or together. It is however important to note that in most embodiments, the respective axes of the attaching means, the supporting means and the handle shafts are in different planes and do not intersect each other.

The above-mentioned clamps preferably include at least one triple locking means for simultaneously adjusting and immobilizing the respective positions of at least one interconnected pair of the attaching means, supporting means and of the handle shafts.

Some of the structural members may have closely spaced, e.g. fluted or serrated, generally elongated locking portions that allow adjustable immobilization of the locking means and/or locking portions.

Furthermore, mutually restrainable but respectively slidable members can be used, allowing length adjustment of the members with respect to each other. One of the slidable members may have therein a channel for a protruding part of an immobilizing means that acts between the two members.

One or more of the members may have three, four, six or more facets, for interengagement with a similarly formed other member, with appropriately shaped guiding portions on at least one of them.

Certain parts, e.g. the securing means (clamps) may constitute articulations for adjusting and immobilizing the connected member in any incremental angular position with respect to the other member. Such articulations are preferably fitted with uniformly spaced radial teeth that allow each of the incremental positions to be set in a strictly overlapping and firmly locking position of the teeth.

The just described articulations can take the place of the clamps, or securing means, between all the constituent parts or members of the inventive handlebars, at least one of these members being disposed in a plane and/or direction that is substantially perpendicular to that of at least one adjoining member.

It is an important feature of the invention that the described constituent parts can be varied, combined in various ways, intermediate ones omitted, and so on, thereby multiplying the possibilities in which the novel articulated handlebars can be assembled and adjusted for use.

Other objects and many of the attendent advantages and features of the invention will be readily appreciated as the same becomes better understood by reference to the following detailed description, when considered with the accompanying drawings, wherein FIG. 1 is a top view of a first, general embodiment of the inventive articulated handlebars, showing alternative handle positions in dot-dash lines;

FIG. 2 is a front view of the embodiment of FIG. 1, also showing displaced positions in both angular and height respects, the handlebars being however in the so-called "touring position" in both FIGS. 1 and 2;

FIG. 2A is a partial front view of the right-hand end of the structure of FIG. 2, showing one of the handles and the associated structural members in the so-called "racing position";

FIG. 3 is a vertical section taken along line 3 — 3 of FIG. 1 through a top clamp, between a supporting member and a handle shaft (the handle being broken away);

FIG. 4 is a horizontal section taken along line 4 — 4 of FIG. 2 through the top clamp of FIG. 3 but at 90° with respect to the latter;

FIG. 5 is a vertical section taken along line 5 — 5 of FIG. 2 through a bottom clamp and the associated members;

FIG. 6 is an end view of an attaching member, toward the bottom clamp of FIG. 5, taken along line 6 — 6 of FIG. 2;

FIG. 7 is a horizontal section taken along line 7 — 7 of FIG. 2 through a supporting member, between the top and bottom clamps of the first exemplary embodiment;

Figure 8:
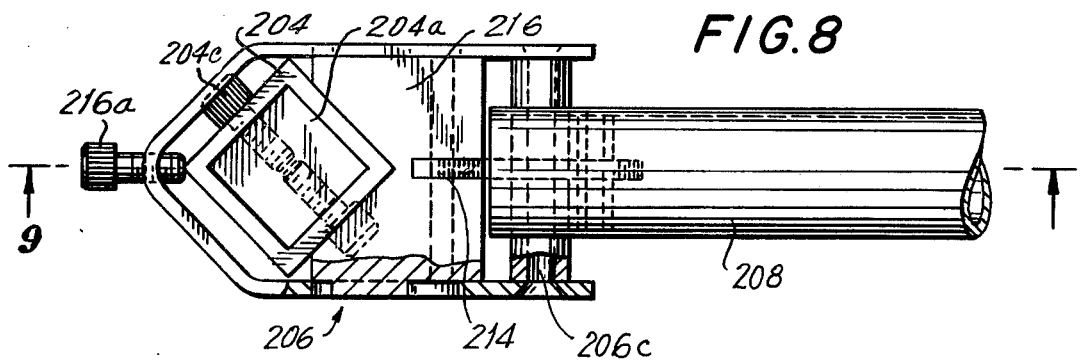
FIG. 8 is a modification of a top clamp (see FIGS. 3 and 4), in a partial horizontal section similar to that of FIG. 4.
Figure 9:
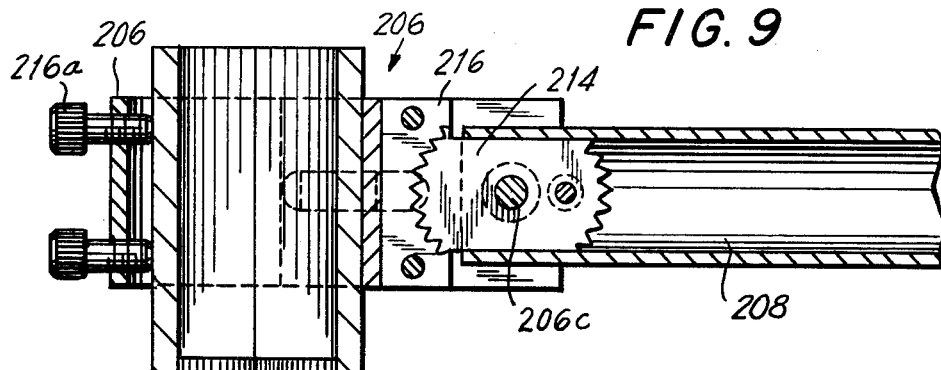
FIG. 9 is a sectional view taken along line 9 — 9 of FIG. 8, illustrating the modified top clamp with the associated members, including a different base clamp, otherwise constituting a (sectioned) counterpart of the right-hand portion of FIG. 2 with the modifications.
Figure 10:
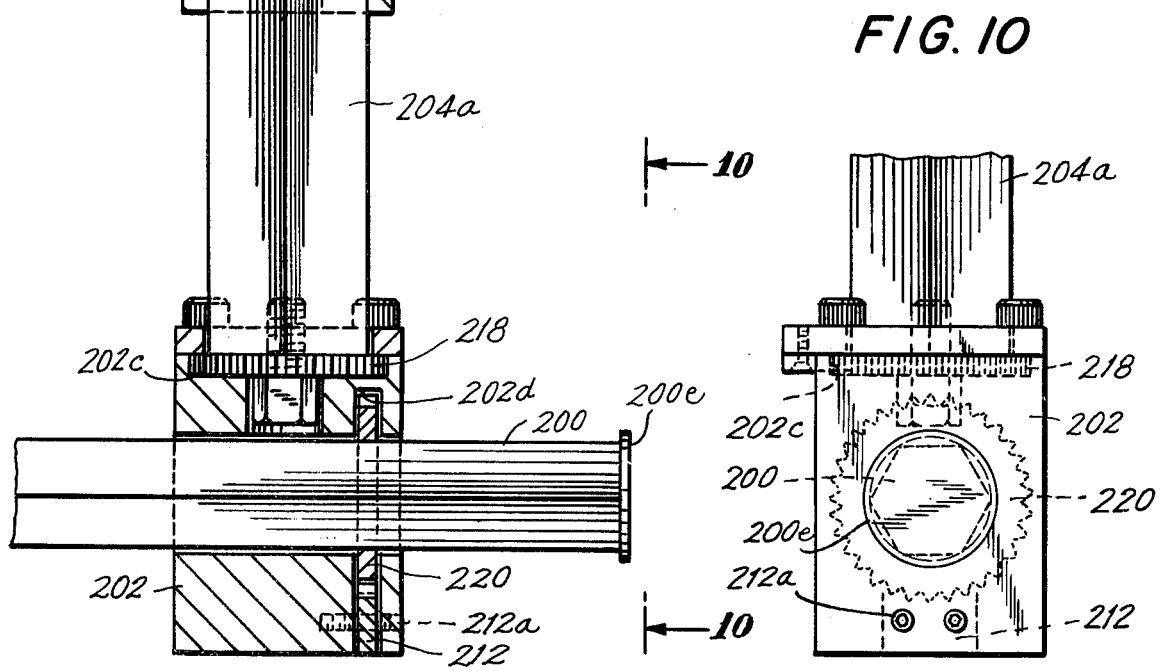
FIG. 10 is a vertical end view taken along line 10 — 10 of FIG. 9, showing the modified base clamp, the attaching and the supporting members (actually an inner rod of the latter, as will be described later)
Figure 20:
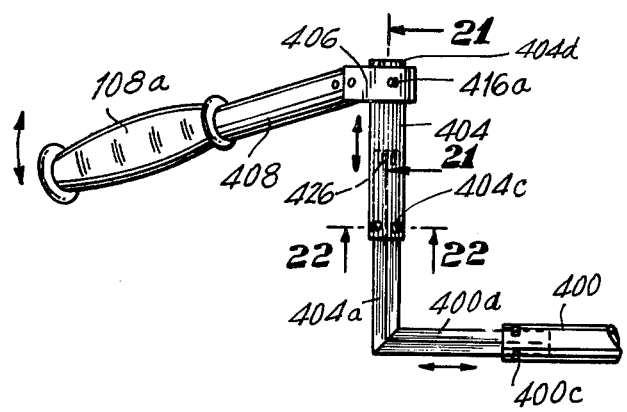
Figure 21:
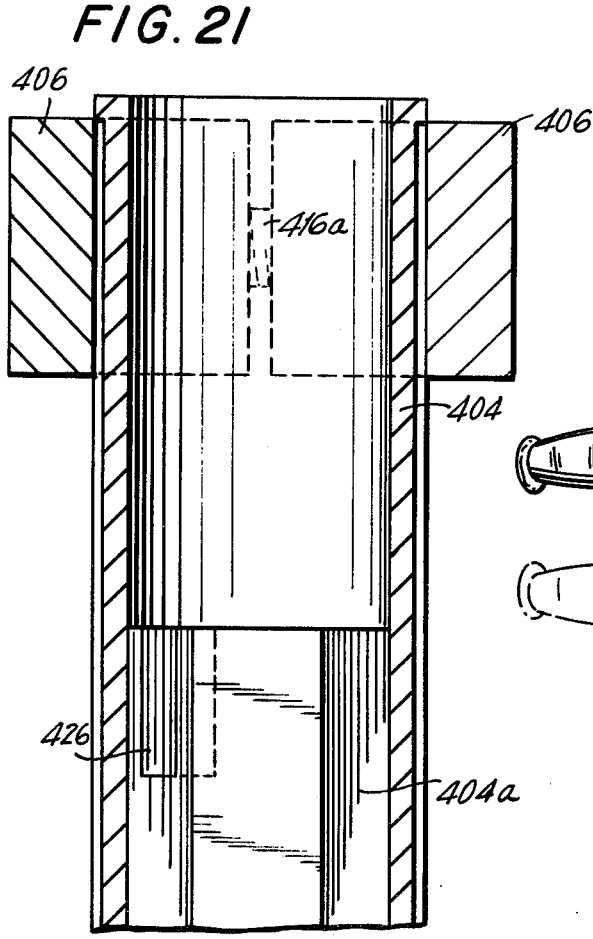
Figure 22:
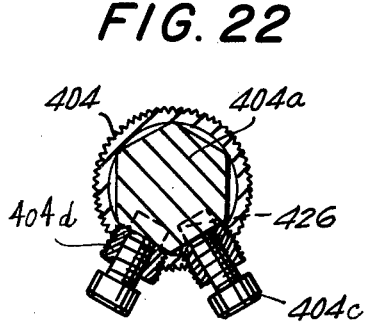
Figure 23:
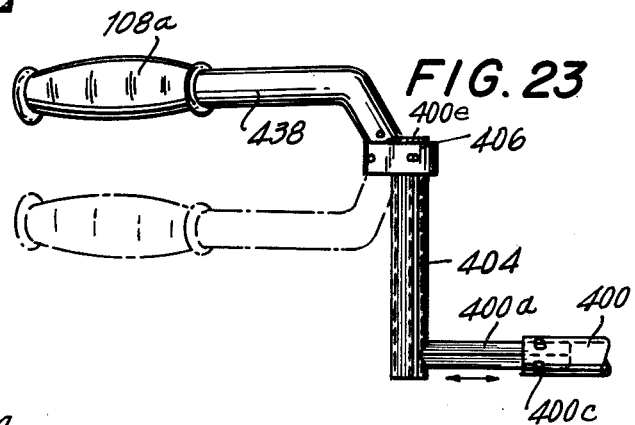
Figure 24:
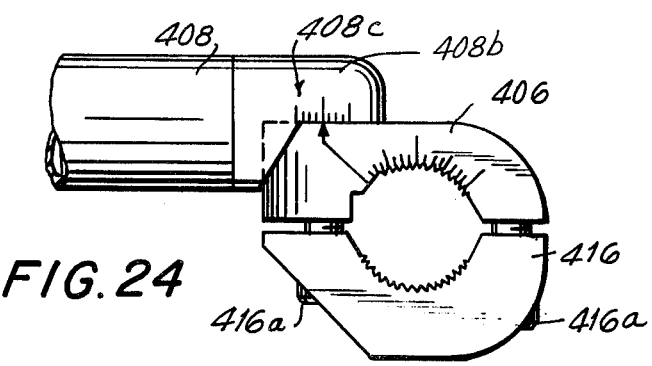
Figure 25:
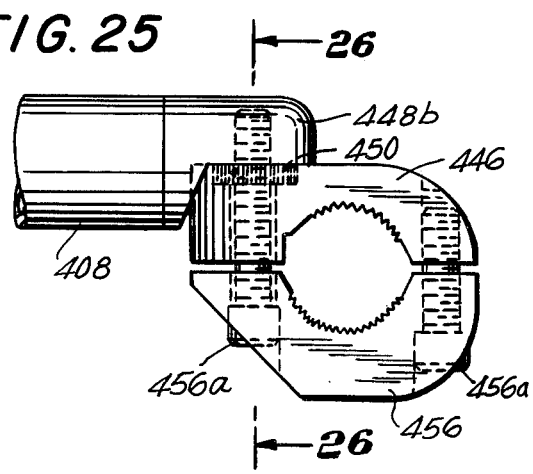

FIGS. 11 through 13 are at least partly sectional views similar to those of FIGS. 8 through 10, respectively, along the respective lines 12 — 12 of FIG. 11 and 13 — 13 of FIG. 12, of another modified top and base clamp arrangement, with the associated members therebetween;

FIG. 14 is an additional, horizontal sectional view of the modified arrangement, taken along line 14 — 14 of FIG. 13, to show the inner arrangement of the base clamp;

FIG. 15 is another modified structure, somewhat similar to the left-hand portion of FIG. 2, but having omitted the support means and clamp of the motorcycle and the like;

FIG. 16 is a partial horizontal section taken along line 16 — 16 of FIG. 15, to show the inner structure of the modified top clamp used in this example;

FIG. 17 is a partly sectional vertical view of the modification, taken along line 17 — 17 of FIG. 16;

FIG. 18 is a downwardly directed, partly sectional horizontal view taken along line 18 — 18 of FIG. 15 to illustrate parts of the slidable attaching members used in this embodiment;

FIG. 19 is a vertical detail section taken along line 19 — 19 of FIG. 16 to show further inventive details;

FIG. 20 is yet another modified structure, with members arranged similar to those of FIG. 15, again similar to the left-hand part of FIG. 2 (with parts omitted);

FIG. 21 is a partial, sectional vertical view taken along line 21 — 21 of FIG. 20 to illustrate the structure of the top clamp (without the handle shaft associated therewith) and the two parts of the slidable supporting members used in this embodiment (the general presentation being similar to the top portions of the earlier FIGS. 9 and 12);

FIG. 22 is a horizontal detail section taken along line 22 — 22 of FIG. 20 showing structural details similar to those of FIG. 19;

FIG. 23 is a further modification, in a partial front view similar to those of FIGS. 15 and 20, to exemplify an angularly bent portion of the handle shaft adjoining the top clamp (e.g. that of FIGS. 15 to 17);

FIG. 24 is a further modification of a top clamp or securing means, similar to FIGS. 16, 17 but showing additional features;

FIG. 25 is yet another modification of a top clamp, with features different from those of the preceding FIG. 24, both being top views;

FIG. 26 is a vertical section along line 26 — 26 of FIG. 25 (but turned in clockwise direction by 90° because of space limitations on this drawing sheet);

FIG. 27 constitutes a further modified structure, similar to the right-hand portion of FIG. 2, otherwise along the lines of the illustrations of FIGS. 9 and 12 but not sectioned;

FIG. 28 is a view from above of the top clamp and the handle shaft used in FIG. 27, along line 28 — 28 thereof;

FIG. 29 is a vertical end view taken along line 29 — 29 of FIG. 27, showing the base clamp used in this further modified embodiment;

FIG. 30 is a reversal of a different bottom clamp, as compared to FIGS. 2, 9, 12 and 27, the same being associated with the attaching member rather than with the supporting member;

FIG. 31 constitutes a different approach in providing the inventive articulated handlebars, with sections and articulations therebetween instead of the so far described bars and members, separated by top and bottom clamps;

FIG. 32 is a detail modification of FIG. 22, in a horizontal section taken in FIG. 23 (without an identifying section line), compatible with the modified structures of FIG. 15 or 20;

FIG. 33 is a vertical section, similar to the lower part of FIG. 21, but including the optional modification shown in FIG. 32; and FIG. 34 is still another modified handlebar structure according to the invention, omitting certain members so as to directly interconnect the modified top clamp of FIG. 15 with an element that can serve as the attaching member of some earlier embodiments.

The use and attachment of the inventive articulated handlebars can best be seen in FIGS. 1, 2 and 2A which will first be described. In FIG. 2, fork tubes or supports 10 are shown (in FIG. 1, visible with a somewhat oval-shaped top portion and in FIG. 2A, broken away toward the left-hand side), which may form part of the motorcycle and the like to which the inventive handlebars are to be attached. By the aid of suitable, conventional fixing clamps 12 and the like, a horizontal member or base bar 100 is attached to the supports 10, in a substantially central, symmetrical position. The member or bar 100 constitutes attaching means, as will be explained later in more detail.

In the first exemplary embodiment constituted by FIGS. 1 to 7 (and 2A, in a different position, as will be explained), bar 100 carries a pair of vertical members or bars 104 which act as supporting means, as can best be seen in FIG. 2. Toward the top ends of these bars 104, respective handle shafts 108 are secured, the outer ends of which carry conventional handles 108a.

There are base clamps 102 between the base bar 100 and the vertical members 104, and top clamps 106 between the latter and the handle shafts 108, again as best visible in FIG. 2. By the means and structural features to be explained further in the description, the vertical members 104 can be moved further in or out (see right-hand portion of FIG. 1), together with their clamps 106; and handle shafts 108 with their handles 108a can be moved higher or lower with respect to the members 104 (see left-hand portion of FIG. 2); and the angular position of the same members can be changed with respect to the members 104 (as shown in the right-hand portion of FIG. 2, in different planes, and also in the left-hand portion of FIG. 1, within the same plane, if necessary).

FIG. 2A, as compared to FIGS. 1 and 2, illustrates yet another positioning or adjusting mode, in that the members 104, 108, 108a (with the associated intermediate elements, e.g. clamps 102, 106) can be turned downward, for "sports" riding or conventional racing bars, as against the more conventional arrangement of the two figures where a high handlebar setting is shown, e.g. for touring. The invention allows all these positions, and all intermediate settings, to be achieved with the same set of articulated handlebars.

Before proceeding to modifications and other exemplary embodiments, and the description of the constituent members of the handlebars, it might be added that the base bar 100 may be fitted with a tab 100b (shown in FIGS. 1, 2, 6) on a cap portion 100e (also visible in FIG. 2A). Such caps, to be mentioned later for subsequent embodiments of the handlebars, serve to impede the removal of the respective associated supporting means, that is the vertical membrs 104, and the handle shafts 108 therefrom.

Details of the base clamps 102 can be seen in FIGS. 1, 2 2A and 5; in the latter one can see a recess or bore 102a for the base bar 100 and a cut-out 102b adapted to receive the tab 100b, in one angular position, when the bar 100 should be removed from the clamp or clamps, e.g. for disassembly or replacement. If a fluted or serrated base bar is used, as shown in these figures (other possible configurations will be described later), it is best to immobilize the bar 100 within the bore 102a of the base clamp 102 by the use of an appropriately profiled locking member 112 (see FIGS. 2A and 5) which can be secured to and removed from the clamp 102 by the aid of bolts 112a and the like (also visible in FIG. 1) although of course other mechanical means can be used to this end.

In the first, general exemplary embodiment of the inventive handlebars (FIGS. 1 to 7), one or both vertical members 104 may have a fluted or serrated outside, and a smooth rod 104a therein (not identified in FIG. 2, but see FIGS. 3 to 5 and 7), this arrangement allowing further vertical extension by a telescoping action in that the inner rod 104a can be secured to the base clamp 102 (see FIG. 5) while the outer fluted member 104 is engaged by the top clamp 106 (see FIG. 3). FIG. 7 shows these members in a horizontal cross-section, also illustrating an immobilizing set screw 104c (also visible in FIG. 5). One or more such screws may be used as required. Further refinements to and associated with these screws will be described for subsequent embodiments.

Coming now to details of the top clamp 106, these can best be seen in FIGS. 3 and 4. A slot 106a in the body of the clamp accommodates a locking blade 114 tht constitutes a rigid extension of the handle shaft 108 and can pivot about a pin or the like 106c. A toothed locking member 116 has the same function as member 112 in engaging peripheral teeth (see FIG. 3) of the blade 114, in selective angular positions (to adjust the handle shaft 108 with its handle 108a, as explained earlier), upon loosening and re-engaging bolts 116a and the like (see FIG. 4). It can thus be seen that the angular adjustment of the members 108, 108a can be accomplished in this exemplary embodiment by a structure similar to that used for the rotational or angular setting of the base clamp 102 with respect to the base bar 100.

The vertical member 104 (or its inner rod 104a, if necessary) may also have a cover, numbered 110, similar to the cap 100e described earlier, optionally with a tab 110a (see FIG. 3) that has to be aligned with a cut-out 106b (FIG. 4) of the clamp 106, if removal is required. The securing of the handle shaft 108 in its top clamp 106 can have the structure of FIGS. 3 and 4, while the clamp itself can be secured to the member 104 by an arrangement similar to that shown in FIGS. 2A and 5 for the base clamp 102, or any arrangements as will be described later for other exemplary embodiments of the inventive handlebars. It will be understood that tabs like the just described 110a, and the earlier-mentioned tab 100b, impede the removal of the associated member from the other structural member to which it is connected (e.g. clamp 106 and member 104 for tab 110a at the top end of the latter).

FIGS. 8 to 10 illustrate modified base-clamp 202 and top-clamp 206 structures, the former being associated with a horizontal member or base bar 200 which, in this modification, is hexagonal rather than fluted as in FIGS. 1 to 7. It should be understood that the bar 200 can have at least three, and of course four, five or any other number of sides or facets.

For immobilizing the bar 200 with respect to the base clamp 202, there is a gear-shaped member 220 slidably applied about the bar 200, which member can be immobilized within a slot 202d of the clamp 202 by the aid of a locking member 212 and bolts 212a associated therewith. It will be understood that some elements are similr to the earlier-described counterparts of the first embodiment; such as 202 to 102; 200 to 100; 212 to 112; etc. A cap 200e is also shown, similar to cap 100e of the first embodiment.

The clamps 202, 206 are joined here with the earlier-explained combination of an outer vertical member 204 and as slidable inner member 204a which, as a matter of example, are shown to be square profiled although a hexagonal or other profile could also be used in the same arrangement. A set screw 204c (similar to 104c) can be seen in FIGS. 8 and 9.

The lower end of member 204a has a reduced profile to receive thereon a toothed locking gear member 218 that can fit into a correspondingly profiled cut-out or recess 202c of the base clamp 202. A removable (unnumbered) cover plate of the clamp allows angular adjustment of the vertical members 204, 204a with respect to the base clamp and the base bar (as was explained earlier in connection with the left-hand portion of FIG. 1).

A handle shaft 208, similar to 108 (and adapted to carry a handle similar to 108a shown and described earlier), has a locking blade 214 secured thereto, engageable in any selected angular position by a toothed locking member 216, bolts 216a being provided to tighten the arrangement after the appropriate angular setting has been made.

The handle shaft 208 can pivot with blade 214 about a pivot 206c of the top clamp when the bolts 216a have been loosened for angular adjustment. FIGS. 11 to 14 are similar to the just described modified embodiments, except for the additional horizontal section shown in FIG. 14. Further modified base-clamp 302 and top-clamp 306 structures are illustrated, the latter being associated with the hexagonal (or differently profiled) base bar 200, as in the previous embodiment. The bar may again have the cap 200e affixed thereto, as described before.

For immobilizing the bar 200 with respect to the base clamp 302, a somewhat different structure is used herein. A supplemental or lower portion 322 is used for the clamp 302 which constitutes an upper portion, connectable by the aid of bolts 324 or the like. The portions 302, 322 have one or more, preferably alternating, inner profiles, to receive the hexagonal or other profile (square, octagonal, etc.) in one or two angularly displaced positions.

Outer 304 and slidable inner 304a members are used, similar to the 204, 204a members described for the previous embodiment, with set screws 304c that were also explained earlier.

The lower end of member 304a again has a reduced profile to receive thereon a toothed locking gear member 318 (also shown in FIG. 14) that fits into a correspondingly profile cut-out 302c of the upper clamp portion 302. Removal and re-assembly of the (unnumbered) cover plate, e.g. by way of the bolts 324, allows re-positioning of the vertical members 304, 304a with respect to the base clamp and the base bar, as in FIGS. 9 and 10.

A handle shaft 308, similar to 108 and 208, for the described handle 108a, has a locking blade 314 somewhat different from 214, associated with an extension 308b, engageable in a selected angular position by a locking member 316, bolts 316a being again provided to tighten the structure after the appropriate setting has been made.

It should be noted that in FIGS. 8, 9 the bolts 216a were axially disposed with respect to the handle shaft 208 while the bolts 316a of FIGS. 11, 12 are perpendicular thereto. In a manner similar to the two-part base clamp 302, 322, the earlier-mentioned top clamp 306 constitutes the top portion while a complementary, lower portion 336 is used. After the bolts 316a have been loosened, angular setting is possible about the right-hand bolt, acting as a pivot for the parts 308b and 308.

Another modified articulated handlebar structure is exemplified in FIGS. 15 to 19, including the handlebar 108a (in FIG. 15) and some modified parts that are similar to the earlier-described counterparts. A smooth base bar 400 is used which however is hollow in this case, to accommodate an inner bar 400a (similar in their structure to the earlier-described vertical outer and inner members 304, 304a of the previous embodiment). The bar of member 400a can be completely telescoped into and thus hidden in the bar 400, if a shorter side-to-side arrangement is desired.

Set screws 400c are provided for interconnecting the bar portions, also similar to the screws 304c. It is shown in FIGS. 18 and 19 that the screws are preferably inserted in small threaded bushings or attachments 400d that extend further inward than the inner walls of the outer bar 400, and thus provide proper guidance for the screws 400c to prevent their front ends from becoming bent or sideways twisted.

The vertical member is again constructed with a hollow outer 404 and an inner portion 404a, interconnecting screws 404c being also provided as required for immobilization in any lengthwise correlation, as can be seen in FIG. 15 where respective vertical and horizontal arrows are added (the latter for the base-bar portions 400, 400a). The outer portion 404 is fluted or serrated, while the inner portion 404a is shown here as being hexagonal. The inner portion 404a can be completely pushed into the outer one, 404. In the illustrated configuration, the earlier-described horizontal bar 400 is fixed to the outer portion 404.

For proper engagement with a top clamp 406, a fluted insert or extension head 404f is preferably used that can be clamped by means of a supplemental portion 416 of the clamp 406, a cap 404b being optionally added to the insert, as shown in FIGS. 15 and 17. Another such cap could be provided at the bottom of the outer portion 404 (not shown).

It should be understood that the outer members 104 . . . 404 constitute respectively slidable first members while the inner members 104a . . . 404a constitute second members, allowing length adjustment therebetween. The outer members are hollow while the inner members are slidable therein. The clamp 406 are removably attachable to and slidable on the inner member, e.g. 404a, for attaching the handle shaft 408 thereto.

In a manner similar to that of FIG. 11, bolts 416a are used in this modified embodiment to clamp the portions 406, 416 about the insert or head 404f (see FIG. 16). The connection between a handle shaft 408 and the top clamp 406 is by way of an extension 408b of the former and an articulation 414 (see FIGS. 16, 17) that allows fine incremental settings upon operating one of the bolts 416a. In FIG. 15, slots 426 are shown, not at full length, which allow the screws 404c to go in deeper without touching or locking with the inner portion 404a.

The articulation 414, also shown in other subsequent figures, serves to adjust and immobilize the handle shaft 408 in this case, in any incremental angular position with respect to the associated portion 404a. The articulation preferably has uniformly spaced radial teeth that allow any incremental angular position to be set in a stricly overlapping and firmly locking position of the teeth.

In FIG. 18 it is shown that the inner bar portion 400a can have a numbered graduation thereon (symmetrically on both sides of the bar portion 400, if necessary), to allow for easy, proper and equal adjustment of both handlebars in the same structure. It should be understood that such a graduation could also or only be provided on the inner member 204a of FIGS. 9 and 10, and/or the similar member 304a of FIGS. 12 and 13, 404a of FIGS. 15 to 17, as well as subsequently described slidable pairs of members (and particularly the inner members of the pairs).

As shown, a "Stop" mark can be applied at a location where further extension would not be recommended, that is, when the inner end of the portion 400a would pass beyond the location where the set screw 400c can engage it (toward the left-hand side, as viewed in the drawing).

A yet further modification is illustrated in FIGS. 20 to 22, with most elements identical with (and others different from) those described and illustrated so far. The elements 108a, 400, 400a, 400c, 404, 404a, 404c, 406, 408, 416a and 426 have all been described earlier but they are differently assembled. Here the inner bar 400a of the horizontal part is connected to the inner portion 404a (rather than the outer one, 404, as shown in FIG. 15).

There is no need for the insert 404f because the top clamp 406 can directly engage the outer vertical portion 404. The sectional view of FIG. 22 is similar to that of FIG. 19 but it relates to the vertical members 404, 404a rather than to the horizontal parts 400, 400a shown in FIG. 19. In FIG. 22 a transversal showing of the slots 426 can be seen that were explained in connection with FIG. 15. Bushings 404d in FIG. 22 are similar to those numbered 400d as explained earlier (see FIGS. 18, 19).

As shown in FIGS. 18, 19, 21, and 22, and described adjustable immobilizing members, that is the screws 104c . . . 304c, 400c, 404c, bear against the inner slidable members 104a . . . 304a, 400a, 404a, respectively, the lengths of the screws being less than the depths of the channel 426 and an intervening wall thickness, so as to avoid getting locked against the bottom of the channel when fully advanced thereinto.

FIG. 23 is a partial view similar to those of FIGS. 15 and 20, to exemplify an angularly bent handle-shaft portion 438, interposed between the top clamp 406 and the shaft 108a, to allow any angular and reversible connection to be made without the articulation 414 (FIG. 17) or the previously described more complicated angular adjustments. The elements 400, 400a, 400c, 400e and 404 have been described earlier and have identical functions. There is no need in this embodiment for an inner member or portion 404a as shown, for example, in FIG. 20. The angularly bent portion 438 of course structurally adjoins the top clamp 406 to which it is adjustably attached.

FIGS. 24 as well as 25, 26 illustrate modified topclamp structures wherein the elements 406, 408, 408b, 416 and 416a are known from the previously described embodiments. In FIG. 24, the interengagement between the clamp portions 406, 416 is similar to that described for FIG. 16, by the aid of the bolts 416a, however with the difference that only a portion of the inner cut-outs in these portions is fluted, to accommodate the vertical member therein, e.g. 404, while lateral portions are undercut and free from the flutes or serrations, to allow easy removal even from the lateral flutes of the vertical member (404).

A graduation 408c may be provided on the extension 408b, for matching with an arrow or the like symbol that can be provided on the clamp portion 406. Similar graduations (not numbered) may be applied to the clamp itself, to be aligned with an axial line or arrow on the respective vertical member (e.g. 404 as illustrated in FIG. 20, or 104 of FIGS. 1, 2, 2A and 3 to 5).

In FIGS. 25 and 26, a modified top clamp is shown with portions 446 and 456, connectable by bolts 456a, the portion 446 having therein a cut-out or recess to accommodate a toothed locking gear member 450 associated with an extension 448b of the handle shaft 408 (see FIG. 26). The recess defined by the clamp portions 446, 456 may again have portions without serrations, that engage the vertical member, as shown. This detail can also be adopted in the previously described FIG. 16.

A further modified structure is shown in FIGS. 27 to 29, similar to the groups of views of the FIGS. 8 to 10 and/or 11 to 14. The elements 100, 100e can be the same as those of FIGS. 1 to 7. The vertical member may again consist of outer 504 and inner portions 504a, connectable to the base bar 100 by way of a clamp 502 that has a mating portion 522, cut along an angularly running line, as can be seen in FIG. 29.

A usual handle shaft 508 is connectable to the outer portion 504 by the aid of a clamp 506 which also has a mating or complementary portion 536, as the just described base clamp. In the base clamp 502, the mating portion 522 can be brought into tight engagement by applying bolts 524, that fix the fluted base bar 100, into the appropriate recess between the clamp portions (visible in FIG. 29). In a similar manner, bolts 516a allow the portions 506, 526 to be interengaged so as tightly to hold the outer member 504, as shown, once its desired angular setting has been chosen. Balls may be provided on the inside, as shown in FIGS. 27, 28 for interlocking the outer and inner portions 504, 504a.

It will be understood by those skilled in the art that the two-part base clamp 502 is similar in its operation to clamp 302 (FIG. 13), however with an irregular, mostly vertical separating line, as against the substantially horizontal gap between the portions 302, 322. The two-part top clamp 506 in turn is similar to clamp 306 (FIG. 11), but having incorporated therein an arrangement similar to that partly shown in FIGS. 11 and 25, respectively. A toothed locking blade or a gear 514 is used in cooperation with a toothed portion 516 of the handle shaft 508.

It is one of the important features of the invention that the described clamps 102 . . . 302, 502, 614 and/or 106 . . . 506, 416, 446, 456, 614 include or constitute at least one triple locking means, e.g. parts 112, 112a, 116, 116a, 406, 416, 416a, 446, 456, 456a, 516 and/or 516a for simultaneously adjusting and immobilizing the respective positions of at least one interconnected pair of the base bar (100, 200 or 400), the members attached thereto (104 . . . 504, 404c, 104a . . . 504a, 404b, 404f, ) and of the handle shafts (108 . . . 508, 438).

FIG. 30, as mentioned before, is a reversal of a bottom clamp, as compared to FIGS. 2, 9, 12 and 27, being associated with the base bar rather than with the supporting member, as will now be explained. The elements 400, 400a, 404 and 502 were all described before but a comparison of this FIG. 30 with FIGS. 15, 20 will show that the direct joining of the base bar (inner portion 400a and outer portion 400) has been substituted by the base clamp 502, allowing adjustable linkage with the outer vertical member 404.

This arrangement allows the member 404 to be extended downward, beyond the clamp 502, if reduction of the vertical height of the assembly is desired.

It has been noted from the preceding description that either the attaching members (such as the base bars 200, 400, 400a, 404a) and/or the supporting members (204 . . . 404) can have at least three facets, as described earlier, and the respective engaging clamps (e.g. 202, 302, on the one hand, and 206 . . . 406, on the other) have correspondingly shaped guiding portions (212, 216 . . . 416) for securely but adjustably immobilizing the facets.

FIG. 31 illustrates a different approach, according to this invention, to provide articulated handlebars, namely with respectively interlinked sections 608c . . . 608g, the latter constituting the base bar while 608c takes the role of the handle shaft to which the usual handle 108a is attached. One of the clamps 12 is also shown as was described for FIGS. 1, 2 and 2A.

Between each successive pair of handle sections, e.g. 608g and 608f, the latter and 608e, and so on, there is an articulation 614 similar to that of FIGS. 16, 17, terminal portions of the sections (e.g. 608f) constituting the mating halves of the adjoining respective articulations 614. One of the articulations, namely between sections 608e and 608d, is in a different plane, with a pivot axis substantially perpendicular to those of the other pairs, thereby making for additional angular versatility in the final set-up of the articulated handlebars.

FIG. 32 is a detail modification of FIG. 22, with a perpendicular section appearing in the companion FIG. 33. The element 404, constituting the outer vertical member (as in FIGS. 15, 16 and others) is associated here with an inner member 464a that is specially shaped with a cut-out or recessed portion 464g, as shown, to allow a set screw and the like 464c to be introduced, which latter has a surrounding bushing 464d. The provision of the latter elements prevents the inner member 464a from being removed entirely from the outer member 404 unless these elements should be disassembled.

The outer portion 404 could of course be serrated like 104, described earlier. It should also be noted that the particular structure of FIGS. 32, 33 could also be applied to a base-bar modification, e.g. members 400 and 400a, all as shown and described in earlier embodiments.

In a simplified form the arrangement can be defined in that the inner or slidable member 464a has a cut-out 464g in a portion thereof while the outer member 404 has the screw and the bushing, numbered 464c, and -d, constituting immobilizing means, engageable with the cut-out.

Finally FIG. 34 illustrates yet another modified handlebar arrangement, omitting certain parts and combining the remaining ones in a rather compact set-up. In succession, this embodiment is constituted by the outer base-bar portion 400 into which is inserted the inner portion 404a (otherwise of a vertical member), having the insert 404f and the cap 404b associated therewith, and being connected to the portion 400 by the similarly described set screws 400c therethrough (of course there may be more than one cap). The clamp 406 (used elsewhere as a "top clamp") now constitutes a base clamp, with the articulation 414 connected to it, for carrying the handle shaft 408 with the handle 108a at its outer end.

In a simplified definition as the one given above, this modification can be expressed as comprising mutually restrainable but respectively slidable portions included in the base bar 400 and the portion 404a, allowing a length adjustment thereof, and wherein the clamp 406 is linked to the handle shaft 408 by the articulation that has uniformly spaced radial teeth thereon.

It will be seen that this modified arrangement actually eliminates the vertical member(s), linking the base bar directly to the "top clamp" that carries the handle mechanism. Referring to FIG. 15, it is easy to understand that the elements 400a and 404 have been eliminated, but the articulation 414 (of FIG. 17) retained, together with the insert 404b, resulting in a space-saving yet efficient arrangement, that is a horizontally flat handlebar configuration.

It will be understood from the foregoing description that the invention provides articulated handlebars for bicycles, motorcycles and the like, which have support means 10 thereon for handlebars, the inventive structure comprising in its most generic form elongated attaching means, that is base bars, e.g. 100, 200, 400, 608g, including means 12 for removably and adjustably fixing the former to the support means; at least one, possibly vertically oriented, supporting means 104 . . . 504, 404c, 104a . . . 504a, 404b, –f, 464a, 608f . . . –d disposed at an angle with respect to the attaching means; at least one handle shaft 108 . . . 508, 438, 608c for carrying at its outer end a conventional handle 108a; and base as well as top clamps, identified as first securing means 102 . . . 302, 502, 614 and second securing means 106 . . . 506, 416, 446, 456, 614, respectively, for attaching the supporting means selectively to intermediate and terminal portions of the attaching means, and the handle shaft selectively to similar portions of the supporting means, respectively; whereby any spatial, height, length and angular attitude can be set for the handle, as required by the operator of the bicycle and the like.

The attaching, supporting and handle shaft means can be defined as constituting, with the securing means, cooperating elements of adjusting means for regulating the above-mentioned spatial and other attitudes with respect to adjoining ones of the elements.

In respect of the earlier-described flutes or serrations it should be summarized that at least one of the attaching means, e.g. 100 or 400, and of the supporting means, e.g. 104, 404, 404f, 504 can have closely spaced, generally elongated first locking portions, and the respective ones of the first and second clamps, that is securing means, e.g. 102, 502 and 106, 406, 416, 446, 456, 506, respectively, can have corresponding closely spaced, generally elongated second locking portions (e.g. 112, 116, 416, 516) that allow, with the first locking portions, adjustable immobilization of the assembled handlebar structure in any embodiment or modification thereof.

It should be understood that many modifications are possible in the described embodiments and combinations of features shown in one or the other figure, without departing from the spirit and the scope of the invention. It is the versatility of the various exemplary arrangements that lends particular usefulness and novelty to the inventive articulated handlebars, wherein features of one embodiment can be readily adapted to and used together with those of others.

What I claim is:

1. Articulated handlebars for bicycles, motorcycles and the like, which have support means (10) thereon for handlebars, the articulated handlebars comprising, in combination: elongated attaching means (100, 200, 400, 608g), including means (12) for removably and adjustably fixing said attaching means to said support means; at least one supporting means (104 . . . 504, 404c, 104a . . . 504a, 404b, –f, 464a, 608f . . . d) disposed at an angle with respect to said attaching means; at least one handle shaft means (108 . . . 508, 438, 608c) for carrying at its outer end a handle (108a); and first (102 . . . 302, 502, 614) and second (106 . . . 506, 416, 446, 456, 614) securing means for attaching said supporting means selectively to intermediate and terminal portions of said attaching means, and said handle shaft means selectively to intermediate and end portions of said supporting means, respectively; whereby any spatial, height, length and angular attitude can be set for said handle, as required by the operator of the bicycle and the like.

2. The articulated handlebars as defined in claim 1, wherein said attaching means (100, 200, 400) is held in a substantially parallel relation with said support means (10) of the bicycle and the like by way of said fixing means (12); said supporting mean (104 . . . 404f) extends substantially vertically from said intermediate and said terminal portions of the attaching means by way of said first securing means (102 . . . 302, 502); said handle shaft means (108 . . . 508, 438) extends substantially outwardly from said intermediate and said end portions of the supporting means by way of said second securing means (106 . . . 506, 416, 446, 456); and wherein said attaching, said supporting and said handle shaft means, in conjunction with said securing means, constitute cooperating elements of adjusting means for regulating at least one of the height, length and the relative angular attitude of said elements with respect to adjoining ones thereof.

3. The articulated handlebars as defined in claim 2, wherein pairs are provided of said supporting means (104 . . . 608d) and of said handle shaft means (108 . . . 508, 438, 608c).

4. The articulated handlebars as defined in claim 1, wherein the respective axes of said attaching means (100, 200, 400, 608g), said supporting means (104 . . . 608d) and of said handle shaft means (108 . . . 508, 438, 608c) are in different planes and do not intersect each other.

5. The articulated handlebars as defined in claim 1, wherein said first (102 . . . 302, 502, 614) and said second (106 . . . 506, 416, 446, 456, 614) securing means include at least one triple locking means (112, –a, 116, –a, 406, 416, –a, 446, 456, –a, 516, –a) for simultaneously adjusting and immobilizing the respective positions of at least one interconnected pair of said attaching means (100, 200, 400), supporting means (104 . . . 404f) and of said handle shaft means (108 . . . 508, 438).

6. The articulated handlebars as defined in claim 1, wherein at least one of said attaching means (100, 400) and of said supporting means (104, 404, 404f, 504) has closely spaced, generally elongated first locking portions, and the respective ones of said first (102, 502) and said second (106, 406, 416, 446, 456, 506) securing means have corresponding closely spaced, generally elongated second locking portions (112, 116, 416, 516) allowing adjustable immobilization of said locking portions with respect to each other.

7. The articulated handlebars as defined in claim 1, wherein at least one of said attaching means (100, 200) and of said supporting means (104, 304, 404f, 504) includes cap means (100e, 110, 200e, 404b) to impede removal of the respective associated supporting means and handle shaft means (108 . . . 508, 438) therefrom.

8. The articulated handlebars as defined in claim 1, wherein at least one of said attaching means (100) and of said supporting means (104) has tab means (100b, 110a, 400b) on at least one respective end to impede removal of said supporting means from said attaching means, and of said handle shaft means (108) from said supporting means, respectively.

9. The articulated handlebars as defined in claim 1, wherein at least one of said attaching means (100, 200, 400) and of said supporting means (104 . . . 504, 404f) includes a mutually restrainable but respectively slidable first member (104 . . . 304, 400, 404, 504) and a corresponding mutually restrainable but respectively slidable second member (104a . . . 304a, 400a, 404a, 464a, 504a) allowing length adjustment of said members with respect to each other.

10. The articulated handlebars as defined in claim 9, wherein said first slidable member is constituted by a hollow outer portion (104 . . . 304, 400, 404, 504) of the respective attaching means (100, 200, 400) and supporting means (104 . . . 504, 404f), while said second slidable member is constituted by a slidable inner portion (104a . . . 304a, 400a, 404a, 464a, 504a) of said respective attaching and supporting means.

11. The articulated handlebars as defined in claim 10, wherein said second securing means is in the form of clamp means (406) removably attachable to and slidable on said inner portion (404a), for attaching said handle shaft means (408) thereto.

12. The articulated handlebars as defined in claim 10, wherein said second member (464a) has a cut-out (464g) in a portion thereof while said outer portion (404) has adjustable immobilizing means (464c, –d) engageable with said cut-out.

13. The articulated handlebars as defined in claim 9, further comprising adjustable immobilizing means (104c . . . 304c, 400c, 404c, –d) in one of said slidable members (104 . . . 304, 400, 404, 504), to bear against another of said slidable members (104a . . . 304a, 400a, 404a).

14. The articulated handlebars as defined in claim 13, wherein said second slidable member (404a) has in a portion thereof a channel (426) for a protruding part of said immobilizing means (404c), the length of the latter being less than the depth of said channel and an intervening wall thickness, so as to avoid getting locked against the bottom of said channel when fully advanced thereinto.

15. The articulated handlebars as defined in claim 9, wherein said supporting means (404) is at least partly hollow, and into which a portion (404a) of said secnd slidable member can be removably inserted.

16. The articulated handlebars as defined in claim 1, wherein at least one of said first and said second securing means (106 . . . 306) includes a first toothed portion (116 . . . 316) for incrementally adjustable engagement with a matching second portion (114 . . . 314) that forms part of one of said attaching means, said supporting means (104 . . . 304) and of said handle shaft means (200), (108 . . . 308).

17. The articulated handlebars as defined in claim 1, wherein at least one of said attaching means (200, 400, 400a, 404a) and of said supporting means (204 . . . 404) has at least three facets, and the respective one of said first (202, 302) and of said second (206 . . . 406) securing means has correspondingly shaped guiding portions (212, 216 . . . 416) for securely but adjustably immobilizing said facets.

18. The articulated handlebars as defined in claim 17, further comprising selectively adjustable guiding portions associated with said first (202, 302) and said second (206 . . . 406) securing means for against said facets of the at least one attaching means (200, 400, 400a, 404a) and of said supporting means (204 . . . 404).

19. The articulated handlebars as defined in claim 17, wherein said at least one of the attaching means (200, 400a, 404a) and of the supporting means (404) is substantially hexagonal in profile.

20. The articulated handlebars as defined in claim 1, wherein at least one of said first (202, 302, 406, 446, 502, 506) securing means includes toothed means (218, 318, 450, 514) for radial adjustment with respect to a matching toothed portion (202c, 302c, 408b, 448b, 516) forming part of one of said attaching means (200), said supporting means (204, 304, 504) and of said handle shaft means (408, 508).

21. The artculated handlebars as defined in claim 1, wherein said second securing means (406, 416) includes an articulation (414) by which said handle shaft means (408) is adjustable and immobilizable in any incremental angular position with respect to the associated supporting means (404a).

22. The articulated handlebars as defined in claim 21, wherein said articulation (414) has uniformly spaced rdial teeth that allow each of the incremental angular positions to be set in a strictly overlapping and firmly locking position of said teeth.

23. The articulated handlebars as defined in claim 1, wherein said handle shaft means (438) has an angularly bent portion adjoining the respective one (406) of said second securing means where it is attached.

24. The articulated handlebars as defined in claim 1, wherein said supporting means is constituted by at least three successive sections (608f . . . d), said securing means between said attaching means (608g) and said sections are in the form of at least two articulations (614), and an intermediate one (608d) of said sections is disposed in a direction substantially perpendicular to that of at least one adjoining section (608c, −e).

25. The articulated handlebars as defined in claim 1, wherein said attaching means (400) and said supporting means (404a) include mutually restrainable but respectively slidable portions allowing length adjustment thereof, and wherein said second securing means (406) is linked to said handle shaft means (408) by an articulation (414) having uniformly spaced radial teeth thereon.

* * * * *

UNITED STATES PATENT OFFICE
CERTIFICATE OF CORRECTION

PATENT NO. : 4,023,436
DATED : May 17, 1977
INVENTOR : Peter W. Dodge

It is certified that error appears in the above-identified patent and that said Letters Patent are hereby corrected as shown below:

Column 9, line 6, change "and described" to -- the described --;

clumn 14, line 36 (claim 16, third line from end), change "attaching means," to -- attaching means (200), --;

line 38 (last line of claim 16), cancel "(200),"

line 50 (claim 18, line 4 thereof), change "for against" to -- for bearing against --.

Signed and Sealed this sixteenth Day of August 1977

[SEAL]

Attest:

RUTH C. MASON
Attesting Officer

C. MARSHALL DANN
Commissioner of Patents and Trademarks